United States Patent
Marsh et al.

(10) Patent No.: US 11,125,471 B2
(45) Date of Patent: Sep. 21, 2021

(54) METHOD FOR A RADIATOR EGS TO HARVEST GEOTHERMAL ENERGY

(71) Applicant: THE JOHNS HOPKINS UNIVERSITY, Baltimore, MD (US)

(72) Inventors: Bruce D. Marsh, Hunt Valley, MD (US); Markus Hilpert, Baltimore, MD (US); Peter Anderson Geiser, Lyons, CO (US)

(73) Assignee: The Johns Hopkins University, Baltimore, MD (US)

( * ) Notice: Subject to any disclaimer, the term of this patent is extended or adjusted under 35 U.S.C. 154(b) by 602 days.

(21) Appl. No.: 14/730,548

(22) Filed: Jun. 4, 2015

(65) Prior Publication Data

US 2015/0354859 A1 Dec. 10, 2015

Related U.S. Application Data

(60) Provisional application No. 62/007,667, filed on Jun. 4, 2014.

(51) Int. Cl.
| | |
|---|---|
| *F24T 10/20* | (2018.01) |
| *E21B 43/24* | (2006.01) |
| *E21B 43/247* | (2006.01) |

(52) U.S. Cl.
CPC ........... *F24T 10/20* (2018.05); *E21B 43/2405* (2013.01); *E21B 43/247* (2013.01); *Y02E 10/10* (2013.01)

(58) Field of Classification Search
CPC .................................. F24J 3/085; Y02E 10/14
See application file for complete search history.

(56) References Cited

U.S. PATENT DOCUMENTS

| | | | | |
|---|---|---|---|---|
| 4,200,152 A | * | 4/1980 | Foster | ................... E21B 41/005 166/271 |
| 4,223,729 A | * | 9/1980 | Foster | ..................... E21B 43/17 166/271 |

(Continued)

FOREIGN PATENT DOCUMENTS

| | | |
|---|---|---|
| KR | 10-1237723 B1 | 2/2013 |
| WO | 2013169242 A1 | 11/2013 |
| WO | WO-2013169242 A1 * | 11/2013 ............. E21B 43/25 |

OTHER PUBLICATIONS

International Search Report and Written Opinion dated Oct. 23, 2015 for related PCT/US2015/034140.

(Continued)

*Primary Examiner* — Waseem Moorad
*Assistant Examiner* — Neel Girish Patel
(74) *Attorney, Agent, or Firm* — Harrity & Harrity, LLP

(57) ABSTRACT

An embodiment in accordance with the present invention includes an EGS configured to allow the commercial production of electrical energy. One criteria of an EGS according to the present invention is that the temperature and volume of the fluids extracted are sufficiently high and large enough as to allow the commercial production of electrical energy. The system is able to operate for at least N years before the extracted fluid falls below the minimum temperature needed for energy production. Additionally, fractures are separated from each other by a sufficiently large volume of rock ($V_{crit}$) relative to the fractures surface area such that the ratio of the rate of heat extraction to the rate of heat supply controlled by the thermal conductivity of the rock is such that the intervening rock is cooled at a rate that is sufficiently slow to be economic.

20 Claims, 5 Drawing Sheets

(56) References Cited

U.S. PATENT DOCUMENTS

| | | | | |
|---|---|---|---|---|
| 6,179,069 B1* | 1/2001 | Zheng | ............... | E21B 21/00 166/308.1 |
| 2006/0026961 A1* | 2/2006 | Bronicki | ............... | F02C 1/05 60/641.2 |
| 2008/0083538 A1* | 4/2008 | Soliman | ............... | E21B 43/114 166/308.1 |
| 2009/0065252 A1* | 3/2009 | Moos | ............... | E21B 7/06 175/50 |
| 2010/0000736 A1* | 1/2010 | Bour | ............... | E21B 33/124 166/281 |
| 2010/0307756 A1* | 12/2010 | Jung | ............... | E21B 43/17 166/308.1 |
| 2011/0011557 A1* | 1/2011 | Shelton, Jr. | ............... | E21B 7/005 165/45 |
| 2011/0247816 A1* | 10/2011 | Carter, Jr. | ............... | E21B 43/26 166/298 |
| 2012/0043077 A1* | 2/2012 | Edwards | ............... | E21B 43/26 166/250.1 |
| 2012/0043080 A1* | 2/2012 | Edwards | ............... | E21B 43/26 166/264 |
| 2012/0198844 A1* | 8/2012 | Kaminsky | ............... | F24T 10/20 60/641.5 |
| 2013/0032349 A1* | 2/2013 | Alekseenko | ............... | E21B 43/26 166/308.1 |
| 2013/0140020 A1* | 6/2013 | Suarez-Rivera | ............... | E21B 43/26 166/250.1 |
| 2013/0341029 A1* | 12/2013 | Roberts | ............... | E21B 43/263 166/308.1 |

OTHER PUBLICATIONS

Hilpert et al., "The radiator-enhanced geothermal system: Benefits of emulating a natural hyrdothermal system", Interpretation, (2016) 14 pages.

* cited by examiner

METHOD FOR A RADIATOR EGS TO HARVEST GEOTHERMAL ENERGY

CROSS REFERENCE TO RELATED APPLICATIONS

This application claims the benefit of U.S. Provisional Patent Application No. 62/007,667 filed Jun. 4, 2014, which is incorporated by reference herein, in its entirety.

FIELD OF THE INVENTION

The present invention relates generally to energy production. More particularly, the present invention relates to a system and method for harvesting of geothermal energy from non-hydrothermal sources.

BACKGROUND OF THE INVENTION

Non-hydrothermal sources of thermal energy include hot dry rock (HDR) and hot sedimentary aquifers (HSA). Non-hydrothermal sources of thermal energy can only be harvested by what are called enhanced geothermal systems (EGS). EGS are essentially manufactured thermal reservoirs.

Extracting thermal energy from non-hydrothermal sources requires overcoming a major physical barrier, the low thermal conductivity of rock. To date no EGS systems have been able to harvest commercial quantities of thermal energy because there is currently no method for overcoming this problem. A purely conductive method for extracting geothermal energy is easily defeated by the very low thermal conductivity of rock. While natural hydrothermal systems represent a solution to this problem, because they ultimately depend on heat conduction convection for their source of thermal energy, there is not currently a method for implementing such a system. This suggests that an EGS emulating a hydrothermal system may offer a solution to the problem of the low thermal conductivity of rock and at the same time permit extraction of a sufficient volume of fluid that is of a temperature permitting commercial electrical generation.

Accordingly, there is a need in the art for a system and method to facilitate an EGS emulating a natural hydrothermal system in order to harvest geothermal energy at commercial levels.

SUMMARY OF THE INVENTION

The foregoing needs are met, to a great extent, by the present invention which provides a system for harvesting geothermal energy including a non-hydrothermal source of energy. The system includes an injector well and a production well. The system also includes an approximately vertical radiator vane located in a plane defined by the injector well and the production well. The term 'radiator vane' in essence emulates in overall form and performance a radiator heat exchanger in a common internal combustion engine.

In accordance with an aspect of the present invention, the injector well and the production well each include a vertical pilot hole and a lateral. The injector well and the production well are each connected to a pumping unit. The injector well and the production well are oriented to define a vertical plane that is parallel to a maximum horizontal stress axis. The injector well and the production well are drilled sufficiently deep such that the principal stress axis is vertical. The critical depth is greater than approximately 700 m. The injector well is drilled to a depth, which is at the $T_{max}$ isotherm and which is deeper than the production well. The production well is at the depth of a $T_{min}$ isotherm, where $T_{min}$ is greater than the minimum ambient rock temperature for commercial production of energy. The radiator vane is created by successive controlled fracs, one above the other, in successively higher laterals located in the plane defined by the injector and production wells.

In accordance with another aspect of the present invention, a method for harvesting geothermal energy includes creating an EGS power unit in a non-hydrothermal source. The method includes drilling an injector well with a lateral oriented to parallel a maximum horizontal stress at a depth where a principal stress axis is vertical and the ambient rock temperature is greater than $T_{min}$. The method also includes drilling a production well with a lateral oriented parallel to a maximum horizontal stress at a depth where a principal stress axis is vertical and the ambient rock temperature is $T_{min}$. Additionally, the method includes generating a radiator vane with successive controlled fracs, one above the other, in successively higher laterals located in the vertical plane defined by the injector and production wells.

In accordance with yet another aspect of the present invention, the method includes extracting fluid with a sufficiently high temperature and volume large enough to allow the commercial production of energy. The method includes optimizing the system to operate for a predetermined number of years before extracted fluid falls below a minimum temperature needed for energy production. The method also includes separating fractures from each other by a sufficiently large volume of rock ($V_{crit}$) relative to a surface area of the fractures, such that the ratio of the rate of heat extraction to the rate of heat supply controlled by thermal conductivity of the non-hydrothermal source is such that the intervening rock is cooled at a rate that is sufficiently slow as to provide an economic source of energy.

In order to keep the "Radiator" cells size reasonable it is necessary to make their heat production transitory, i.e. yield commercial quantities of heat for a fixed period rather than steady state. However if the unit is to be commercial it must be able to generate heat for what amounts to a steady state. This is done by having a set of radiator cells which are successively harvested. The individual cells must be of sufficient size to be able to provide the required energy for commercial production for a period of years. To meet this condition the "Radiator" EGS unit must cycle production among a set of "radiator" cells. A schematic of this system is shown in FIG. 5.

Continuous energy production is maintained by cycling through the radiator cell system in the following fashion. Energy production is from one cell at a time, e.g. Cell 1. When the temperature of the produced fluid reaches the minimum temperature required for commercial energy production, the cell is shut in and moved to a fully restored cell, e.g. Cell 3. Cell 1 then is allowed to re-equilibrate to the ambient geothermal gradient, e.g. Cell 2.

The number of cells (n) required and their size, is set by the number of years for a complete cycle through all of the cells as to allow the $i^{th}$ cell to return to its initial thermal state. Thus each volume would be allowed to recover for the duration of each cycle; e.g. Volume i produces for N years, then is left to recover while heat extraction shifts to Volume j for N years, etc. The number of cells being set by the amount of time to "draw down" each successive volume such that the total cycle time $T_{total}$=n N, is sufficient to allow each Volume i to recover completely.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
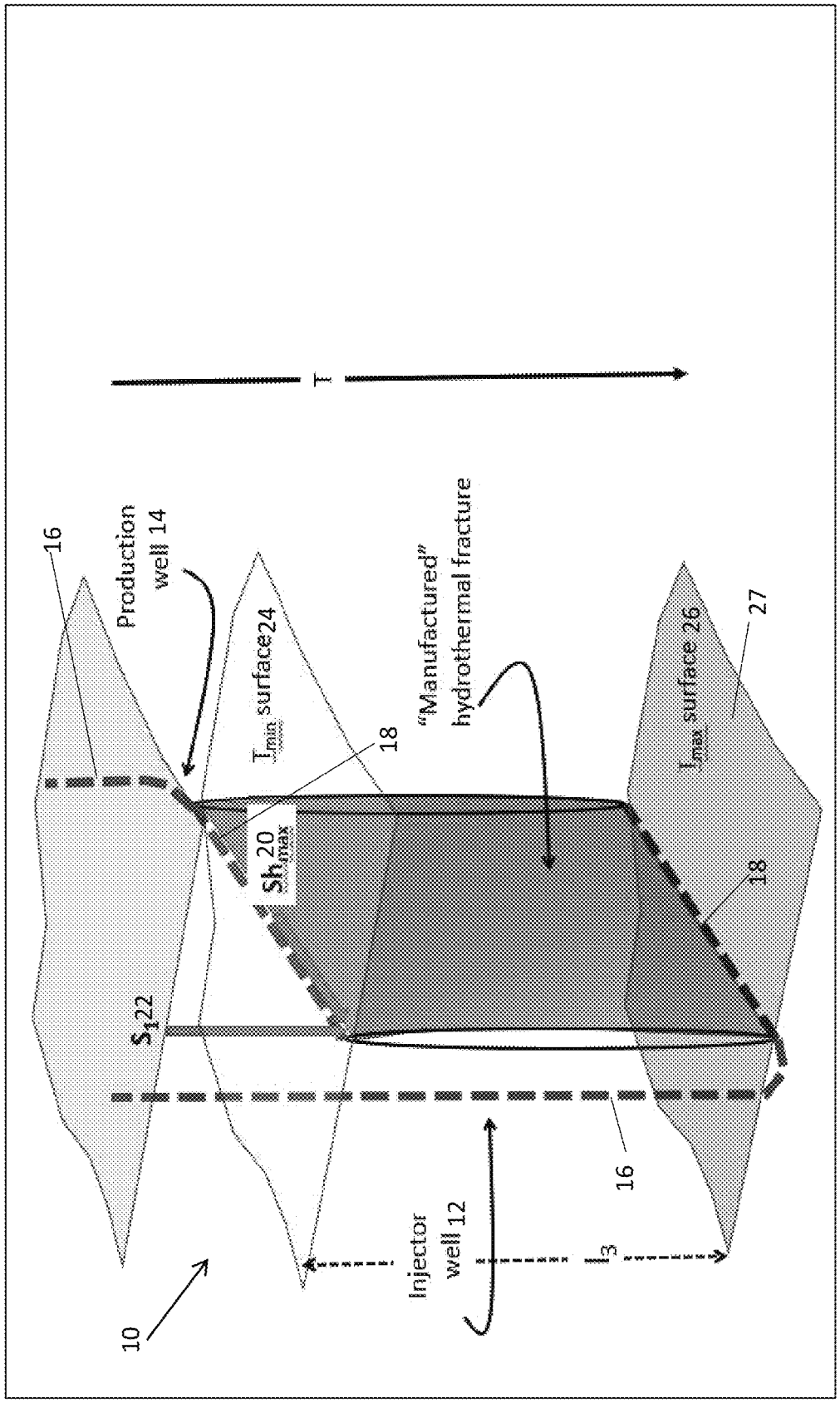
FIG. 1 illustrates a schematic diagram of a Single "vane" unit of a Radiator EGS. A vane is a vertical manufactured fracture system.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An embodiment in accordance with the present invention includes an enhanced geothermal system (EGS) configured to allow the commercial production of electrical energy. One criteria of an EGS according to the present invention is that the temperature and volume of the fluids extracted are of sufficiently high temperatures and large enough volumes as to allow the commercial production of electrical energy. The system is able to operate for at least N years before the extracted fluid falls below the minimum temperature needed for energy production. Additionally, fractures are separated from each other by a sufficiently large volume of rock ($V_{crit}$) relative to the fractures' surface area, such that ratio of the rate of heat extraction to the rate of heat supply controlled by the thermal conductivity of the rock is such that the intervening rock is cooled at a rate that is sufficiently slow to be economic.

The basic structure of the proposed EGS is to create a set of "manufactured" vertical fractures that can circulate fluids through a rock volume such that the final fluid temperature is sufficient for commercial energy production. The key to creating such fractures is to essentially imitate the way that natural transmissive fracture systems are created, but to do so in a fashion that emulates the geometry of radiator vanes, so as to allow control of the system temperature. The geometry and orientation of the "Radiator" systems fractures is controlled by the ambient stress field including $S_1$, the maximum stress, and $S_{Hmax}$, the horizontal stress component. Below about 700 m, and depending on the specific geologic area, $S_1$ is vertical and the average strike of transmissive fractures parallels $S_{Hmax}$.

Creating fractures that include $S_1$ and $S_{Hmax}$ requires drilling laterals that parallel $S_{Hmax}$. This is normal to the direction typically chosen for exploiting unconventional Oil and Gas which are drilled normal to $S_{Hmax}$. Fracking to "manufacture" the transmissive fracture system will require a highly controllable fracking tool such as energetics which can directionally enhance the rock permeability. For example, propellant based fracking could be used to manufacture the transmissive fracture system. Because $S_1$ is vertical, fracture orientations will tend towards Mode 1 which tends to limit permeability. However, there should be sufficient variability in orientation of fragment surfaces such that most will have a significant shear component and therefore provide permeability.

FIG. 1 illustrates a schematic view of a set of two wells including of an injector and production well. The system 10 includes the injector well 12 and the production well 14 as a vane unit. Each well includes a vertical pilot hole 16 and a lateral 18 with each well 12, 14 connected to a pumping unit (not illustrated). While one set of injector well 12 and production well 14 are illustrated in FIG. 1 any number of wells can be used, as is known to or conceivable by one of skill in the art. Additionally, examples of expanding the number of wells are also included herein, below. The wells 12, 14 are oriented to parallel the maximum horizontal stress ($S_{Hmax}$) 20 with both drilled to depths where the principal stress axis ($S_1$) 22 is vertical. In general this will be depths >700 m. The production lateral is drilled to parallel the isotherm whose temperature $T_{min}$ is greater than the minimum temperature required for commercial energy production ($T_e$). While Tmin is > that reuired for commercial production we can allow the cell to go to Te, where Te is <Tmin. FIG. 1 illustrates a plane 24 parallel to the isotherm whose temperature is $T_{min}$. The injector well lateral is drilled to a depth >the depth of the $T_{min}$ isotherm to a depth of an isotherm $T_{max}$. FIG. 1 also illustrates a plane 26 that is parallel to the isotherm whose temperature is $T_{max}$. The length ($l_3$) of the injector below the $T_{min}$ isotherm plane 25 and the length ($l_2$) of the lateral 34 are determined by the relationship $V_{crit}=l_1 \times l_2 \times l_3$, where $l_1$ is the distance between successive vanes. Here $V_{crit}$ is the volume necessary to maintain a temperature of the heated fluid produced at the production well $\geq T_e$ for a sufficient amount of time that it will meet the economic criteria for commercial power generation ($T_e$). The volume $V_{crit}$ is defined as a single "Radiator" cell.

Figure 2:
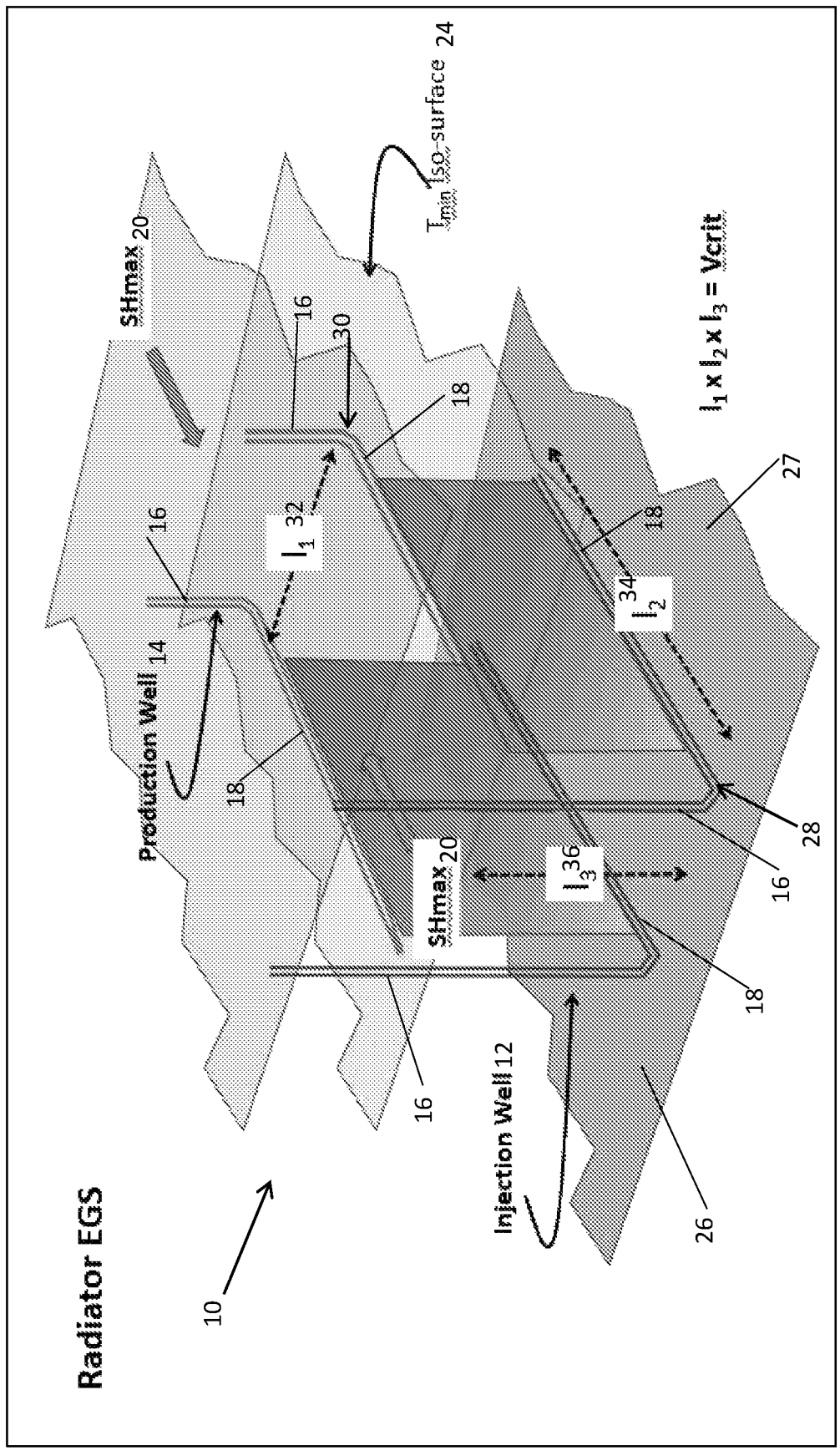
FIG. 2 illustrates a schematic diagram of two "vane" units defining the intervening rock volume as $V_{crit}=l_1 \times l_2 \times l_3$.

FIG. 2 illustrates a schematic diagram of two "vane" units defining the intervening rock volume as $V_{crit}=l_1 \times l_2 \times l_3$. FIG. 2 also illustrates a second vane unit. The second vane unit includes a second injection well 28 and a second production well 30. $l_1$, 32 is defined as a distance between the laterals 18 of the production wells 14 and 30. $l_2$, 34 is defined as a length of the lateral 18 of the injection well 28. $l_3$, 36 is defined as a height between the lateral of the injection well 12 and the production well 14. $V_{crit}$ is then the volume defined by $l_1 \times l_2 \times l_3$.

The "Radiator Vane" or "manufactured" fracture, is created by successive controlled fracs, one above the other in successively higher laterals located in the plane defined by the injector and production wells. The pressures created by the fracking agent, must be sufficient and rapid enough to exceed the fundamental strength of the rock and thereby open up fractures in the rock. Rocket propellant is an example of such an agent. Because the production and injection wells are directly above and parallel to one another and because the plane they so define includes both $S_1$ 22 and $S_{hmax}$ 20 with $S_{hmm}$ 27 normal to this plane, the successive lateral fracs will form a vertical zone of fractured rock.

Figure 3:
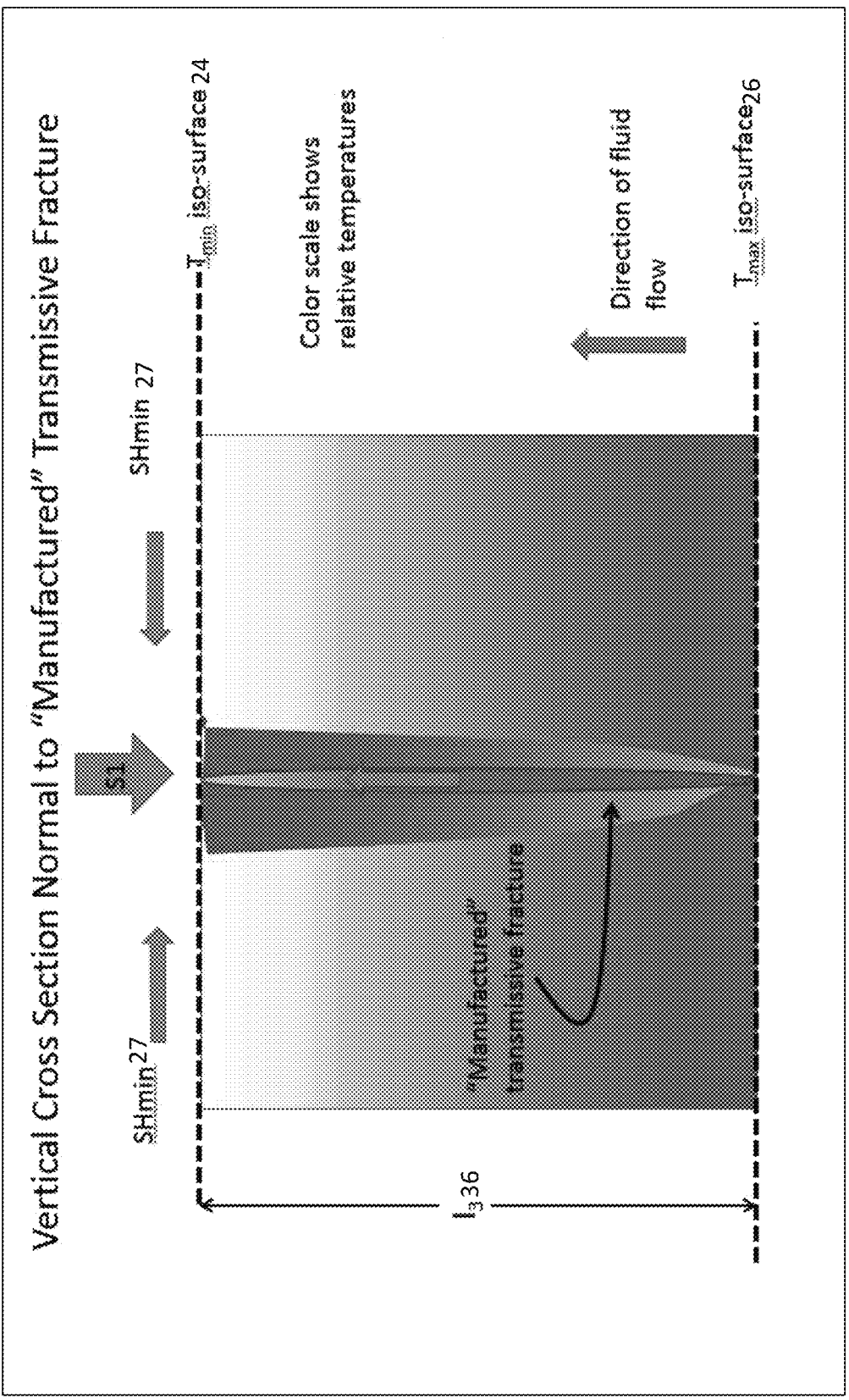
FIG. 3 illustrates a schematic diagram of temperature distribution due to injection of fluid at a depth where rock temperature is $>T_{min}$.
Figure 4:
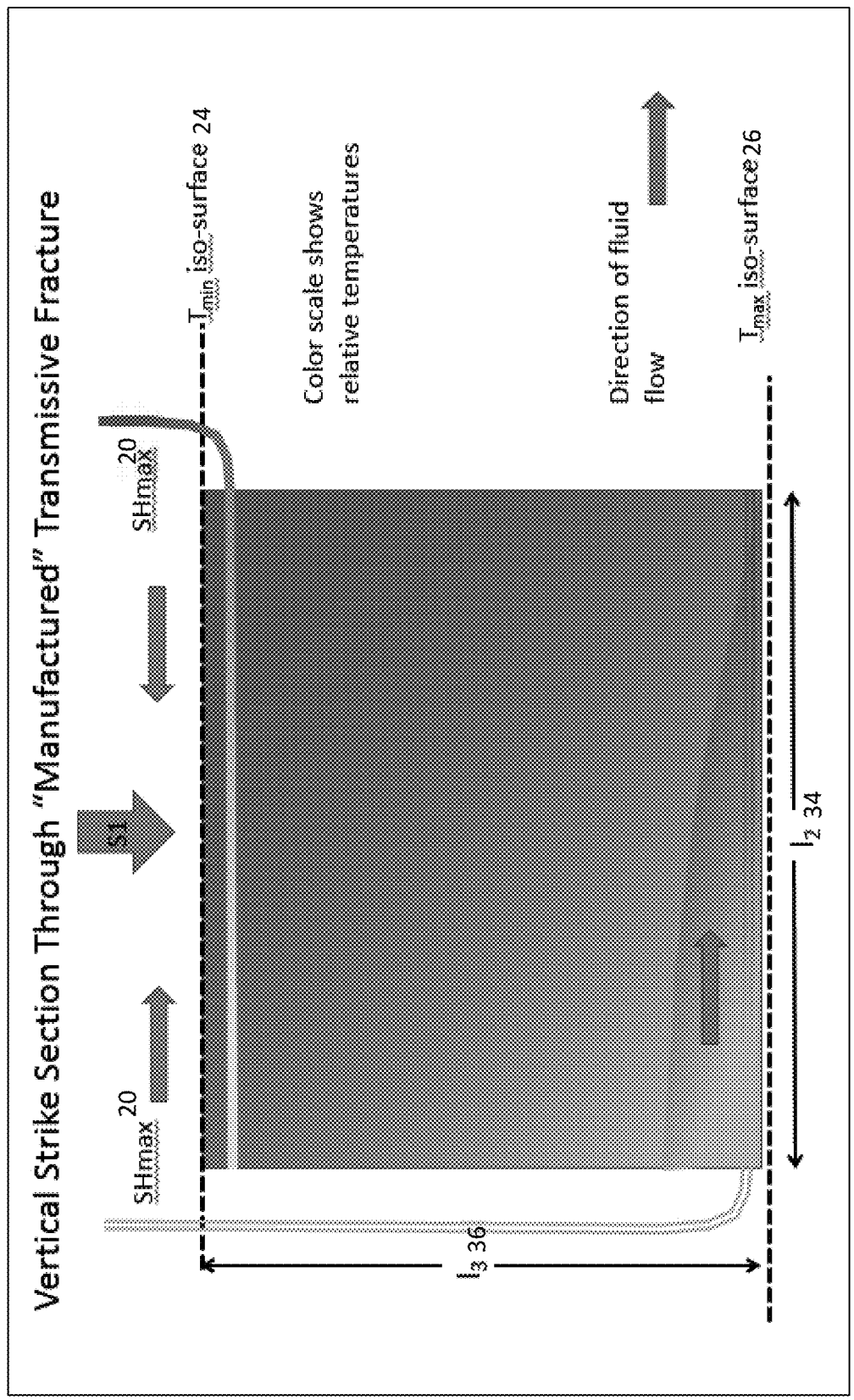
FIG. 4 illustrates a schematic diagram of a strike section to schematically illustrate how cooling will be slowed due to increasing temperature of fluid as it moves along the injector lateral.

FIG. 3 illustrates a schematic diagram of temperature distribution due to injection of fluid at a depth where rock temperature is $>T_{min}$, and FIG. 4 illustrates a schematic diagram of a strike section to schematically illustrate how cooling will be slowed due to increasing temperature of fluid as it moves along the injector lateral. FIGS. 3 and 4 show how the system functions to solve the problem of the low thermal conductivity of rock resulting in the too rapid cooling of the surrounding rock. The basic concept is to inject fluid at some depth $l_3$, 36, below the isotherm surface 24 whose temperature $T_{min}$ is the minimum required for producing commercial quantities of electrical energy. By doing so as the fluid rises at some point its temperature will be greater than that of the surrounding rock, thus instead of cooling the rock through which it is now passing, it will heat it, as illustrated in FIG. 3. Because the temperature of the surrounding rock through which the fluid is rising is $>T_{min}$, the fluid emerging above the $T_{min}$ isosurface 24 and available for energy production, will be $>T_{min}$ for some period of time. The critical parameter $l_3$ 36 is a function of the vertical temperature gradient, dT/dz. The fluid temperature can be maintained to the surface by insulating the casing above the $T_{min}$ isosurface. The direction of fluid flow in FIG. 3 is vertical.

A similar effect will occur for the "Manufactured" fracture along its strike, as illustrated in FIG. 4. As the fluid enters the fracture at the beginning of the injector lateral, it cools the surrounding rock but itself is gradually heated as it moves along the injector lateral. The result is that as the fluid at the end of the lateral rises its temperature will be closer to the ambient temperature at the depth of the $T_{max}$ isotherm 26. Consequently there will be even less and therefore slower cooling of the surrounding rock above the lateral "toe" as fluid rises towards the production well. As illustrated in FIGS. 3 and 4, color scale shows relative temperatures. Dark is hottest and light is coolest. $T_{min}$ isotherm 24 is at a depth where the ambient rock temperature is higher than the one required for commercial energy production. The direction of fluid flow in FIG. 4 is lateral.

In order to keep the "Radiator" cells size reasonable it is necessary to make their heat production transitory, i.e. yield commercial quantities of heat for a fixed period rather than steady state. However, if the entire EGS, including of multiple cells, is to be commercial it must be able to generate heat for what amounts to a steady state. This is done by having a set of radiator cells which are successively harvested. The individual cells must be of sufficient size to be able to provide the required energy for commercial production for a period of years. To meet this condition the "Radiator" EGS unit must cycle production among a set of "radiator" cells. A schematic of this system is shown in FIG. 5 and described by the following.

Figure 5:
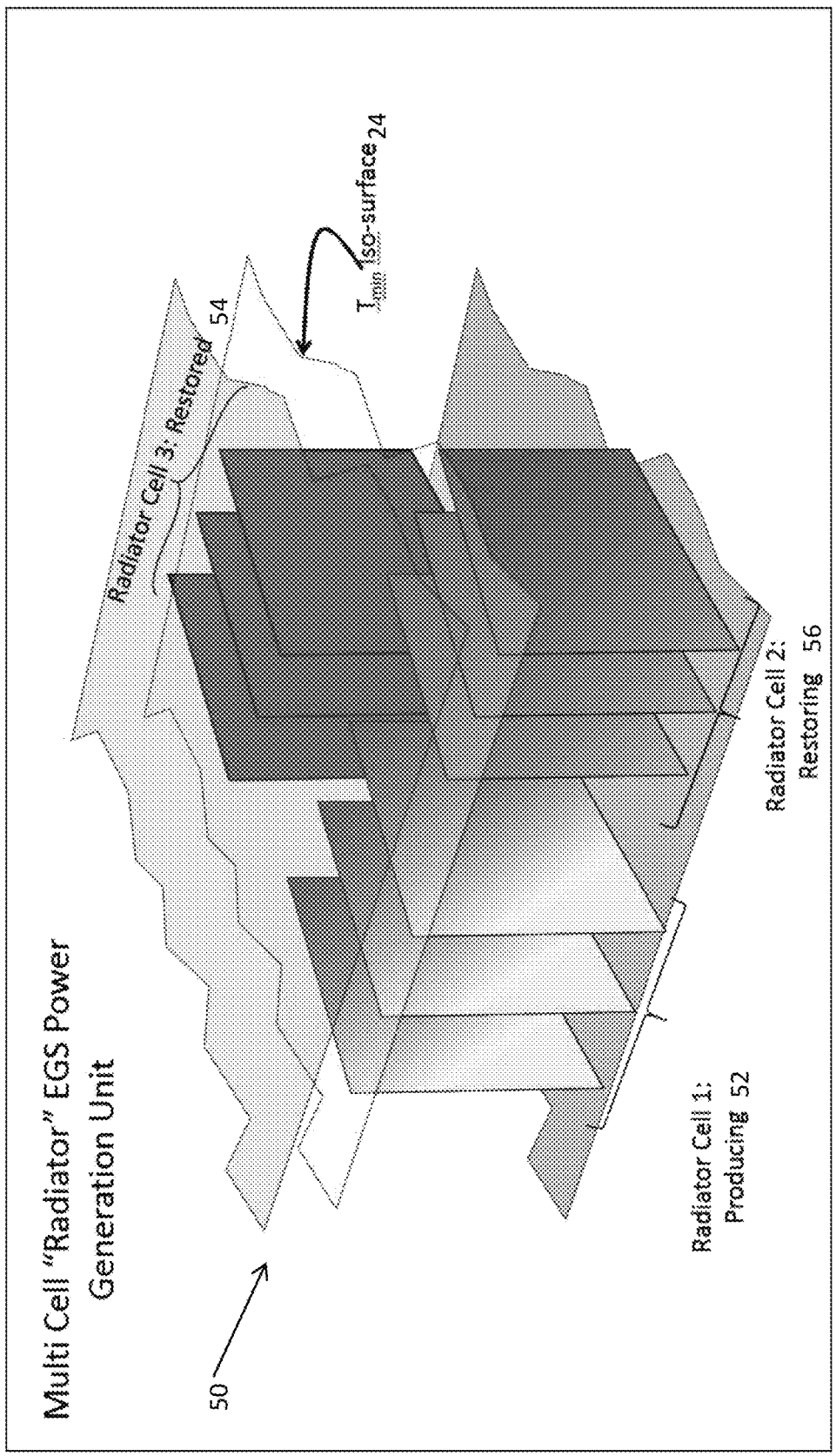
FIG. 5 illustrates a schematic diagram of a multi-cell radiator unit to allow permanent continuous generation of electrical energy.

FIG. 5 illustrates a schematic diagram of a multi-cell radiator unit to allow permanent continuous generation of electrical energy. Continuous energy production is maintained by cycling through the radiator cell system 50 in the following fashion. Energy production is from one cell at a time, e.g. Cell 1, 52. When the temperature of the produced fluid drops below the minimum temperature required for commercial energy production, the cell is shut in and moved to a fully restored cell, e.g. Cell 3, 54. Cell 1 then is allowed to re-equilibrate to the ambient geothermal gradient, e.g. Cell 2, 56.

The number of cells required and their size, is set by the number of years for a complete cycle through all of the cells as to allow the $i^{th}$ cell to return to its initial thermal state. Thus each volume would be allowed to recover for the duration of each cycle; e.g. Volume i produces for N years, then is left to recover while heat extraction shifts to Volume j for N years, etc. The number of volumes (n) being set by the amount of time to "draw down" each successive volume such that the total cycle time $T_{total}$=N, is sufficient to allow each Volume i harvested to recover completely.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for creating an enhanced geothermal system (EGS) power unit in a non-hydrothermal source, comprising:
   drilling an injector well at a first depth,
      the injector well being associated with:
         a principal stress axis in a vertical direction, and
         a horizontal stress,
            the horizontal stress including a maximum horizontal stress and a minimum horizontal stress,
            the maximum horizontal stress being normal to the minimum horizontal stress,
      the injector well defining a vertical pilot hole and a lateral,
      the lateral being drilled to parallel the maximum horizontal stress;
   drilling a production well at a second depth,
      the production well being associated with:
         a principal stress axis in a vertical direction, and
         a horizontal stress,
            the horizontal stress including a maximum horizontal stress and a minimum horizontal stress,
            the maximum horizontal stress being normal to the minimum horizontal stress,
      the production well defining a vertical pilot hole and a lateral,
      the lateral being drilled to parallel the maximum horizontal stress; and
   generating a manufactured hydrothermal fracture,
      the manufactured hydrothermal fracture extending between a plane defined by the injector well and the production well,
      the manufactured hydrothermal fracture including a plurality of vertical fractures,
         the plurality of vertical fractures being generated by successively controlled fracs that are generated by a propellant based fracking agent,
            the propellant based fracking agent being administered in successively higher laterals to directionally form a vertical zone of continuous fractured rock in each of the plurality of vertical fractures,
         the plurality of vertical fractures extending from the lateral of the injector well to the lateral of the production well with no intermediary injection strings between the lateral of the injector well and the lateral of the production well,
the manufactured hydrothermal fracture being formed to emulate a natural transmissive fracture system.

2. The method of claim 1, further comprising creating the manufactured hydrothermal fracture with energetics.

3. The method of claim 1, where generating the manufactured hydrothermal fracture comprises:
generating the manufactured hydrothermal fracture in the plane defined by the injector well and the production well,
the plane including the principal stress axis and the maximum horizontal stress.

4. The method of claim 1, where the successively higher laterals are parallel to the lateral of the injector well and the lateral of the production well.

5. The method of claim 1, further comprising:
directing fluid through the manufactured hydrothermal fracture,
the fluid flowing laterally and vertically through the plurality of vertical fractures to thereby increase a temperature of the fluid to create a heated fluid.

6. The method of claim 5, further comprising:
extracting the heated fluid for production of electrical energy.

7. The method of claim 1, where the propellant based fracking agent is rocket propellant.

8. The method of claim 1, where the plurality of vertical fractures are configured to emulate a geometry of a radiator vane.

9. A method of manufacturing an enhanced geothermal system, comprising:
forming a first well,
the first well defining:
a vertical pilot hole, and
a lateral,
the vertical pilot hole of the first well extending to a first depth,
the lateral being formed to parallel a maximum horizontal stress at the first depth;
forming a second well,
the second well defining:
a vertical pilot hole, and
a lateral, and
the vertical pilot hole of the second well extending to a second depth, the second depth being less than the first depth, the lateral being formed to parallel a maximum horizontal stress at the second depth; and
forming a manufactured hydrothermal fracture in a plane defined by the first well and the second well,
the plane including:
a principal stress axis, and
a maximum horizontal stress, and
the plane being normal to a minimum horizontal stress, and
the manufactured hydrothermal fracture including:
a plurality of vertical fractures generated by successively controlled fracs that are generated by a propellant based fracking agent,
the propellant based fracking agent being administered in successively higher laterals to directionally form a vertical zone of continuous fractured rock in each of the plurality of vertical fractures,
the plurality of vertical fractures extending from the lateral of the first well to the lateral of the second well with no intermediary injection strings between the lateral of the first well and the lateral of the second well, and
the plurality of vertical fractures being formed to emulate a natural transmissive fracture system.

10. The method of claim 9, where the first well and the second well are drilled to at least a depth where the principal stress axis is vertical.

11. The method of claim 9, where the successively higher laterals are parallel to the lateral of the first well and lateral of the second well.

12. The method of claim 9, where forming the manufactured hydrothermal fracture comprises:
forming the manufactured hydrothermal fracture with energetics.

13. The method of claim 9, further comprising:
directing fluid through the manufactured hydrothermal fracture,
the fluid flowing laterally and vertically through the plurality of vertical fractures to thereby increase a temperature of the fluid to create a heated fluid.

14. The method of claim 13, further comprising:
extracting the heated fluid for production of electrical energy.

15. The method of claim 9, where the propellant based fracking agent is rocket propellant.

16. A method of operating an enhanced geothermal system (EGS) power unit, comprising:
providing a well system including:
an injector well being drilled to a first depth,
the injector well being associated with:
a principal stress axis in a vertical, and
a horizontal stress, the horizontal stress including a maximum horizontal stress and a minimum horizontal stress, the maximum horizontal stress being normal to the minimum horizontal stress, the injector well defining a vertical pilot hole and a lateral,
the lateral being oriented to parallel the maximum horizontal stress, and
a production well being drilled to a second depth,
the production well being associated with:
a principal stress axis in a vertical direction, and
a horizontal stress, the horizontal stress including a maximum horizontal stress and a minimum horizontal stress, °the maximum horizontal stress being normal to the minimum horizontal stress,
the production well defining a vertical pilot hole and a lateral,
the lateral being oriented to parallel the maximum horizontal stress,
the well system including a manufactured hydrothermal fracture, the manufactured hydrothermal fracture including a plurality of vertical fractures generated by successively controlled fracs that are generated by a propellant based fracking agent,
the propellant based fracking agent being administered in successively higher laterals to directionally form a vertical zone of continuous fractured rock in each of the plurality of vertical fractures, the manufactured hydrothermal fracture extending from the lateral of the injector well to the later of the production well with no intermediary injection strings between the lateral of the injector well and the lateral of the production well, the manufactured hydrothermal fracture to emulate a natural transmissive fracture system, directing fluid through the manufactured hydrothermal fracture, the fluid flowing laterally and vertically through the plurality of vertical fractures to thereby increase a temperature of the fluid to create a heated fluid; and extracting the heated fluid for production of electrical energy.

17. The method of claim 16, where the manufactured hydrothermal fracture is located in a plane defined by the injector well and the production well.

18. The method of claim 17, where the plane includes the principal stress axis and the maximum horizontal stress.

19. The method of claim 16, where the manufactured hydrothermal fracture is formed through energetics.

20. The method of claim 16, where the propellant based fracking agent is rocket propellant.

* * * * *

UNITED STATES PATENT AND TRADEMARK OFFICE
CERTIFICATE OF CORRECTION

PATENT NO. : 11,125,471 B2  
APPLICATION NO. : 14/730548  
DATED : September 21, 2021  
INVENTOR(S) : Bruce D. Marsh et al.

Page 1 of 1

It is certified that error appears in the above-identified patent and that said Letters Patent is hereby corrected as shown below:

In the Claims

In Claim 16, Column 8, Line 48, "°the maximum" should be changed to -- the maximum --.

In Claim 16, Column 9, Line 3, "transmissive fracture system," should be changed to -- transmissive fracture system; --.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*